United States Patent
Yokoya

(10) Patent No.: US 11,194,138 B2
(45) Date of Patent: Dec. 7, 2021

(54) ZOOM LENS, IMAGE PICKUP APPARATUS, AND IMAGE PICKUP SYSTEM

(71) Applicant: CANON KABUSHIKI KAISHA, Tokyo (JP)

(72) Inventor: Maki Yokoya, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/932,087

(22) Filed: Jul. 17, 2020

(65) Prior Publication Data

US 2021/0033832 A1 Feb. 4, 2021

(30) Foreign Application Priority Data

Jul. 30, 2019 (JP) .............................. JP2019-139470

(51) Int. Cl.
   *G02B 15/14* (2006.01)
   *G02B 13/18* (2006.01)
(52) U.S. Cl.
   CPC .......... *G02B 15/1425* (2019.08); *G02B 13/18* (2013.01)
(58) Field of Classification Search
   CPC .................................................. G02B 15/1425
   USPC ........................................................... 359/691
   See application file for complete search history.

(56) References Cited

U.S. PATENT DOCUMENTS

| | | | | |
|---|---|---|---|---|
| 2003/0179465 | A1* | 9/2003 | Noda | G02B 15/1425 359/691 |
| 2012/0147480 | A1* | 6/2012 | Fujisaki | G02B 15/177 359/691 |
| 2013/0321682 | A1* | 12/2013 | Yamasaki | G02B 15/144511 348/294 |
| 2014/0022416 | A1* | 1/2014 | Shinohara | G02B 15/177 348/240.3 |
| 2020/0326504 | A1 | 10/2020 | Ino et al. | |

FOREIGN PATENT DOCUMENTS

JP     2005099758 A    4/2005

* cited by examiner

*Primary Examiner* — Darryl J Collins
(74) *Attorney, Agent, or Firm* — Carter, DeLuca & Farrell LLP

(57) ABSTRACT

A zoom lens includes, in order from an object side to an image side, a first lens unit having a negative refractive power and a second lens unit having a positive refractive power, a distance between the first lens unit and the second lens unit changing during zooming. A predetermined condition is satisfied.

16 Claims, 9 Drawing Sheets

ZOOM LENS, IMAGE PICKUP APPARATUS, AND IMAGE PICKUP SYSTEM

BACKGROUND OF THE INVENTION

Field of the Invention

The present invention relates to a zoom lens, which is suitable for a digital video camera, a digital still camera, a broadcasting camera, a film-based camera, a surveillance camera, and the like.

Description of the Related Art

A zoom lens having a wider field angle and a higher image quality has recently been demanded for image pickup apparatuses such as digital still cameras and video cameras, along with an increased number of pixels in the image sensor. Japanese Patent Laid-Open No. ("JP") 2005-099758 discloses, as a wider-angle zoom lens, a negative lead type zoom lens having a first lens unit having a negative refractive power and a second lens unit having a positive refractive power in order from an object side.

In order to achieve a wider angle of view in the negative lead type zoom lens, it is necessary to increase the power of the first lens unit having the negative refractive power, but significant amounts of the distortion and curvature of field will be generated. The zoom lens disclosed in JP 2005-099758 achieves the higher performance by properly setting the configuration of the second lens unit. However, the off-axis performance is not sufficient because the configuration of the first lens unit that most affects the off-axis performance is not properly set.

SUMMARY OF THE INVENTION

The present invention provides a zoom lens, an image pickup apparatus, and an image pickup system, each of which has a wide angle of view and a high optical performance in an overall zoom range.

A zoom lens according to one aspect of the present invention includes, in order from an object side to an image side, a first lens unit having a negative refractive power and a second lens unit having a positive refractive power, a distance between the first lens unit and the second lens unit changing during zooming. The following conditional expressions are satisfied:

$$0.010 < fw/Lw < 0.050$$

$$8.0 < m1/z < 40.0$$

$$-3.5 < f1/fw < -0.8$$

where fw is a focal length of the zoom lens at a wide-angle end, Lw is an overall optical length at the wide-angle end, m1 is a moving amount of the first lens unit during zooming from the wide-angle end to the telephoto end, z is a magnification varying ratio of the zoom lens, and f1 is a focal length of the first lens unit.

An image pickup apparatus and an image pickup system including the above zoom lens also constitute another aspect of the present invention.

Further features of the present invention will become apparent from the following description of exemplary embodiments with reference to the attached drawings.

DESCRIPTION OF THE EMBODIMENTS

Figure 1A:
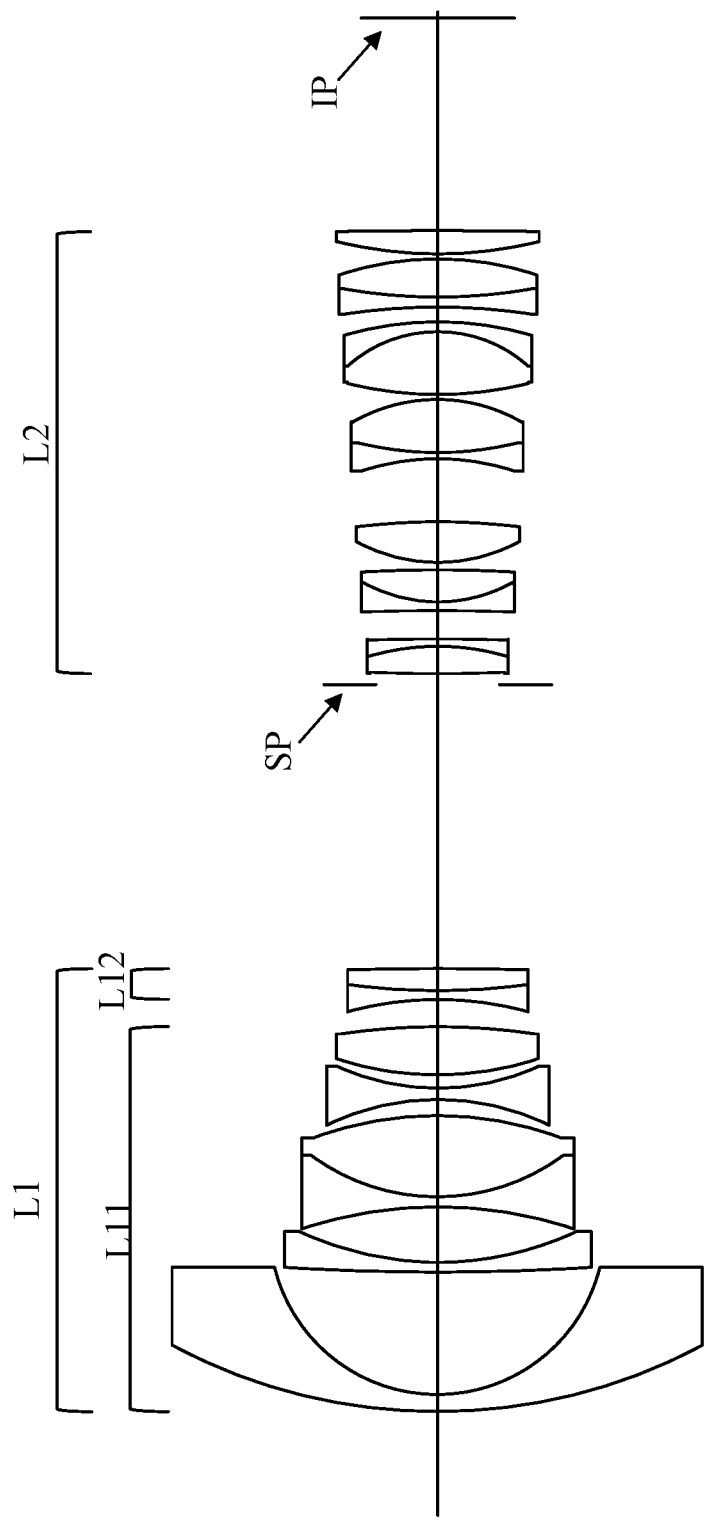
FIG. 1A is a lens sectional view according to Example 1 during focusing on infinity in the shortest focal length state.
Figure 1B:
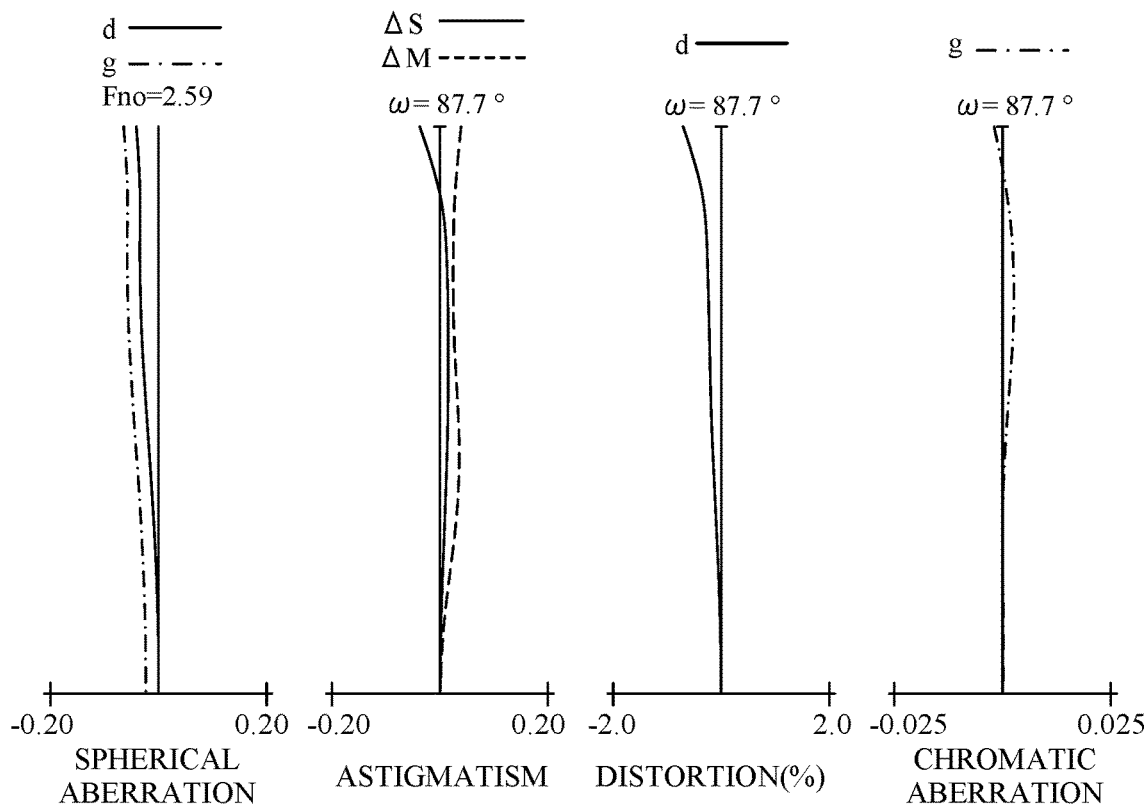
FIG. 1B is an aberration diagram according to Example 1 during focusing on infinity in the shortest focal length state.
Figure 1C:
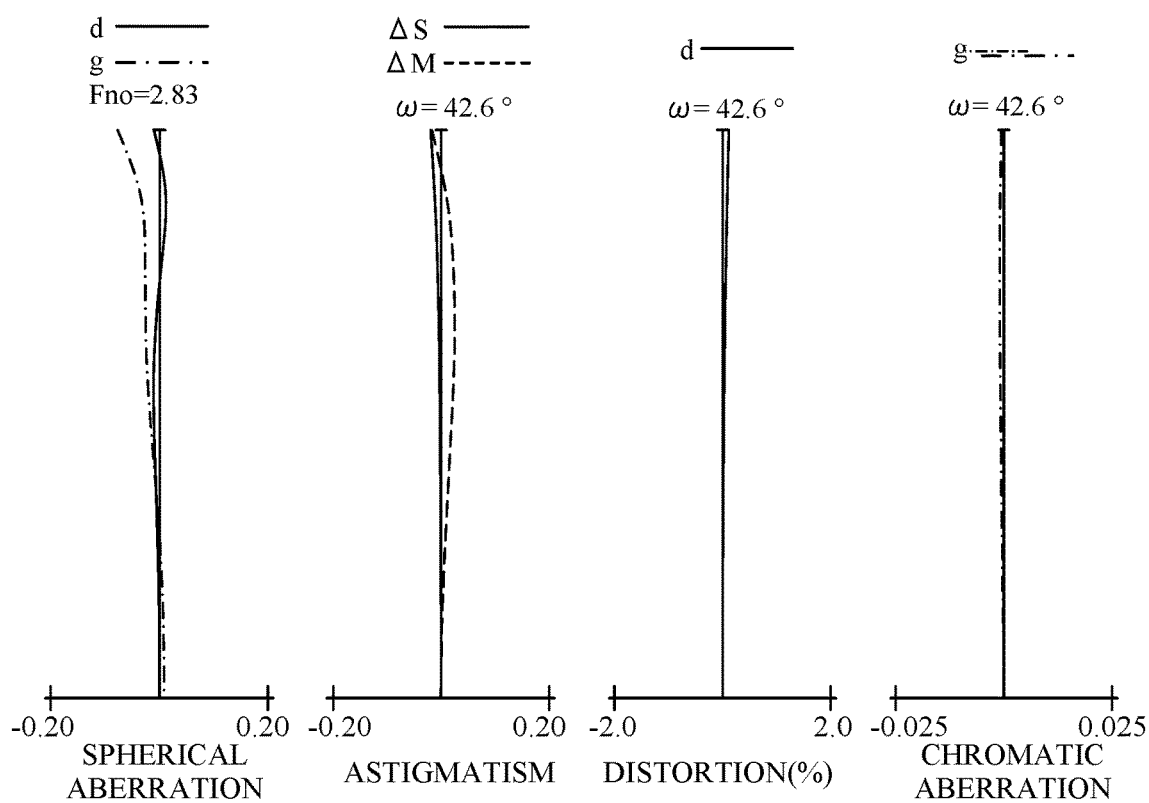
FIG. 1C is an aberration diagram according to Example 1 during focusing on infinity in the longest focal length state.
Figure 2A:
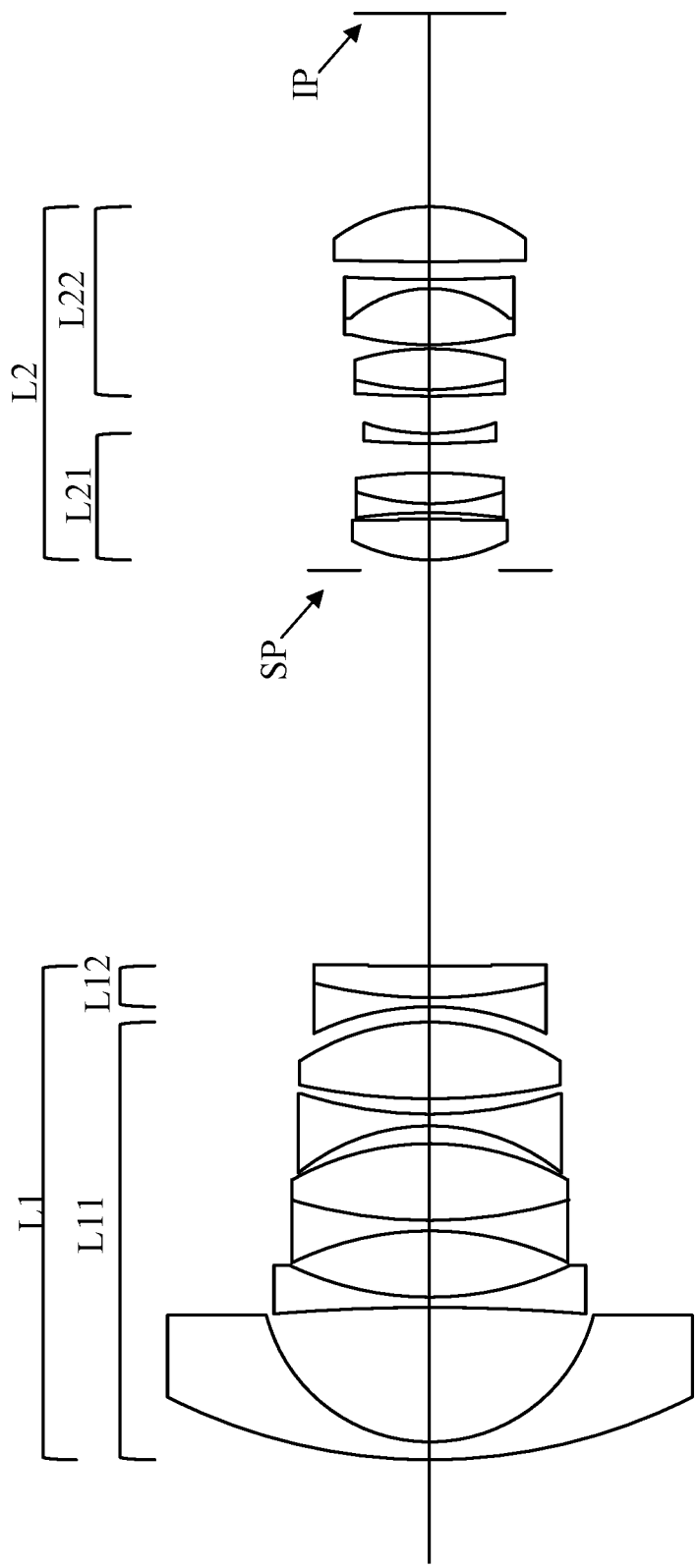
FIG. 2A is a lens sectional view according to Example 2 during focusing on infinity in the shortest focal length state.
Figure 2B:
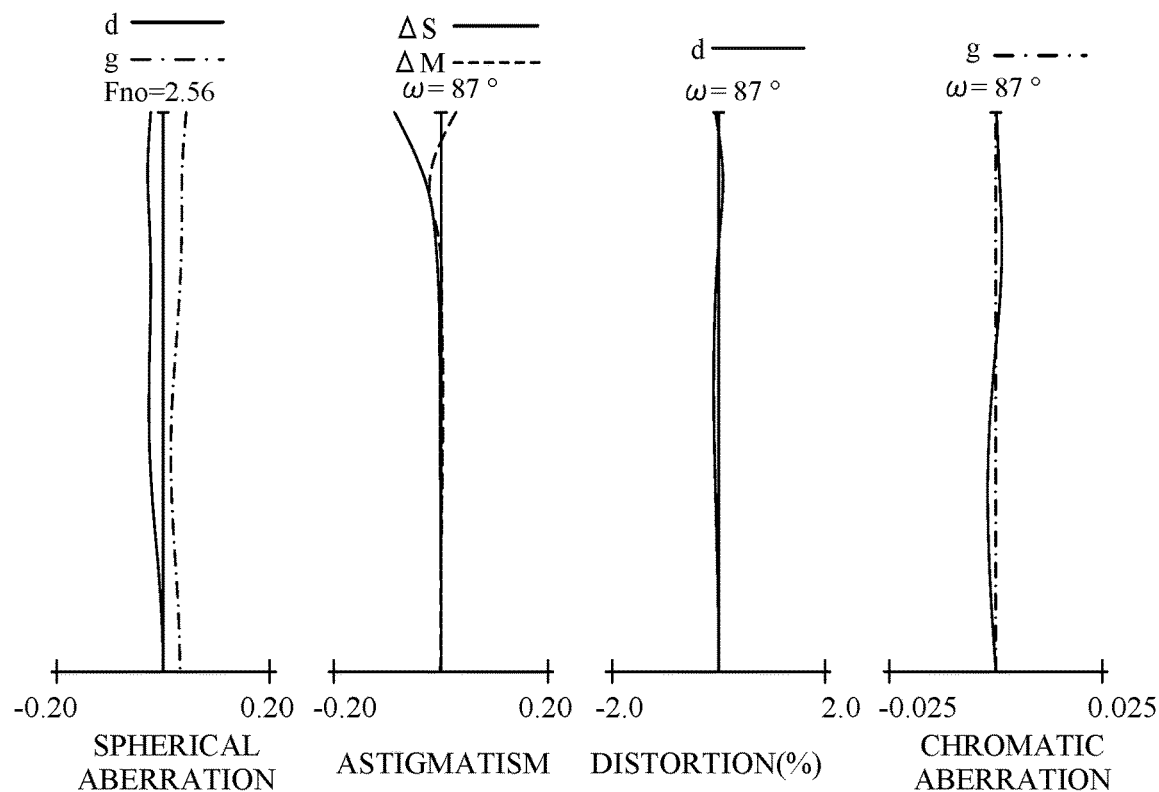
FIG. 2B is an aberration diagram according to Example 2 during focusing on infinity in the shortest focal length state.
Figure 2C:
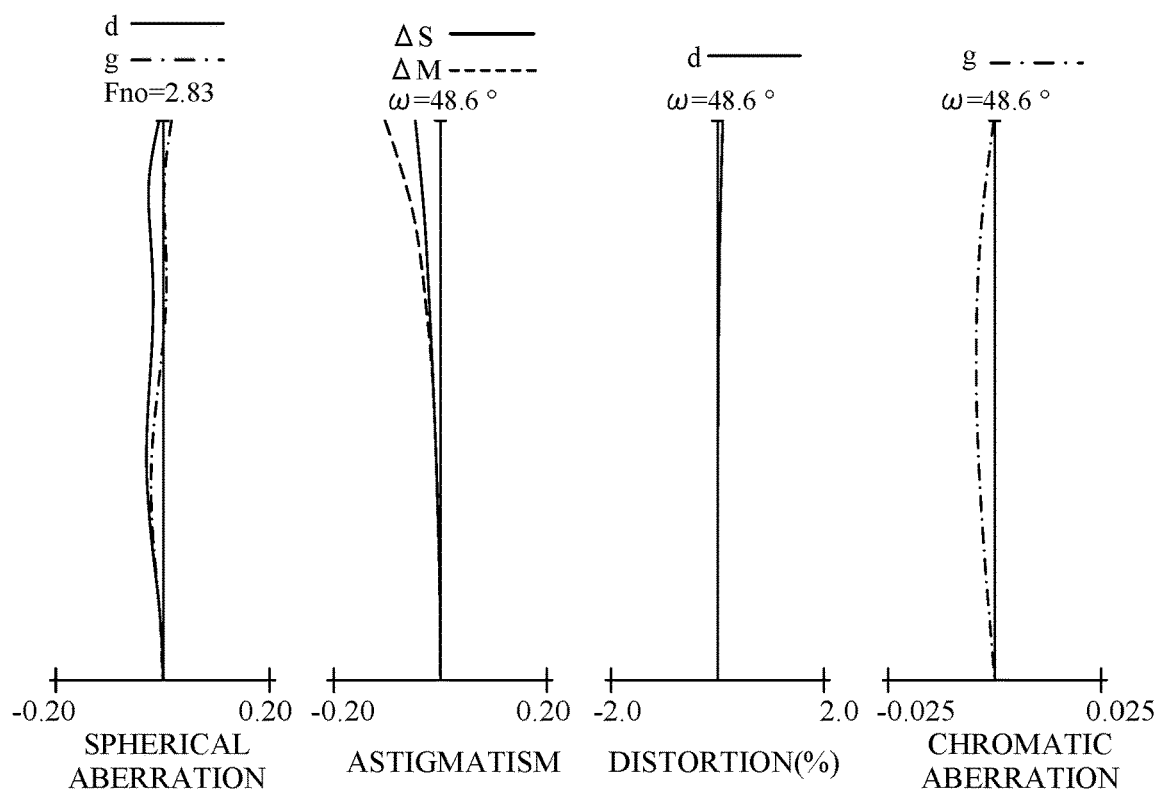
FIG. 2C is an aberration diagram according to Example 2 during focusing on infinity in the longest focal length state.
Figure 3A:
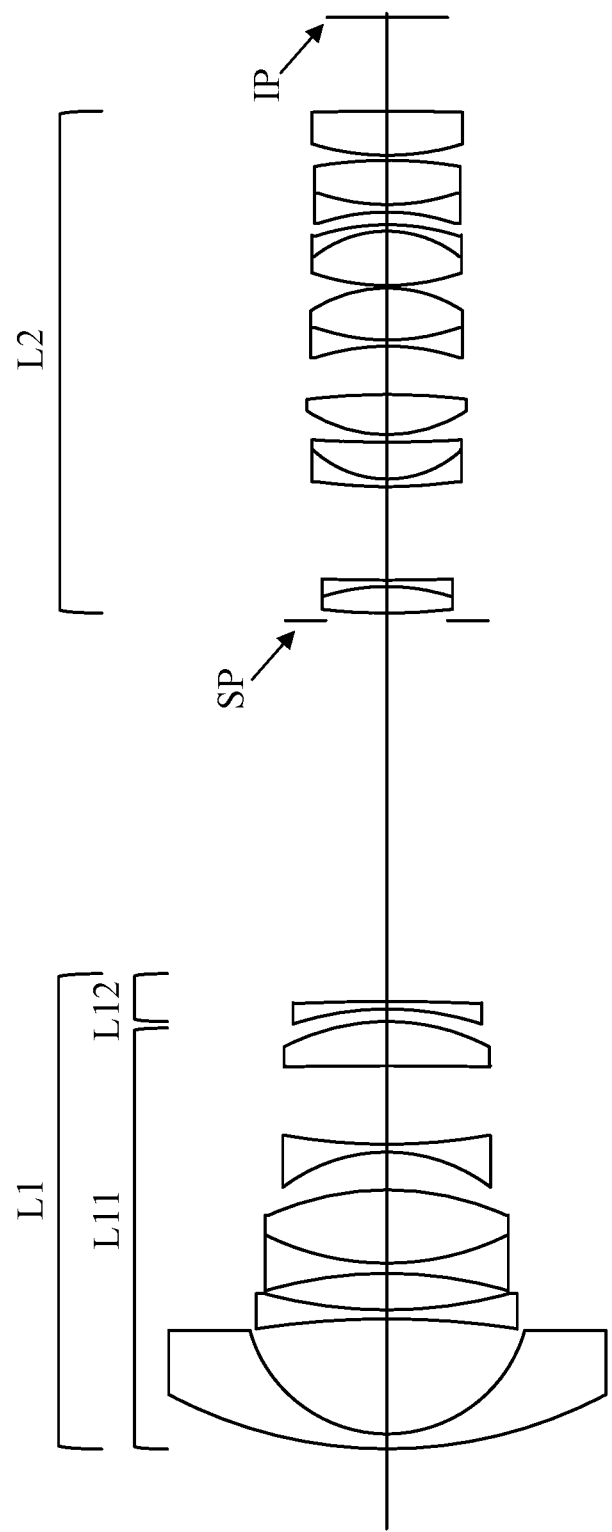
FIG. 3A is a lens sectional view according to Example 3 during focusing on infinity in the shortest focal length state.
Figure 3B:
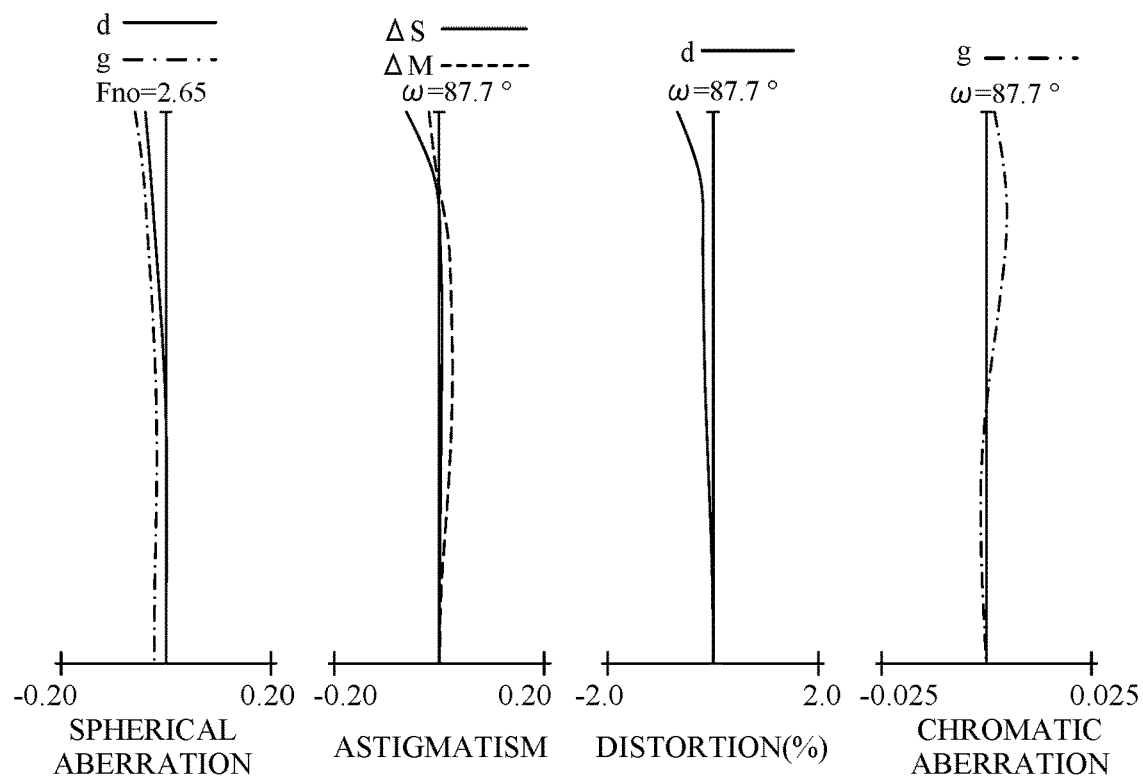
FIG. 3B is an aberration diagram according to Example 3 during focusing on infinity in the shortest focal length state.
Figure 3C:
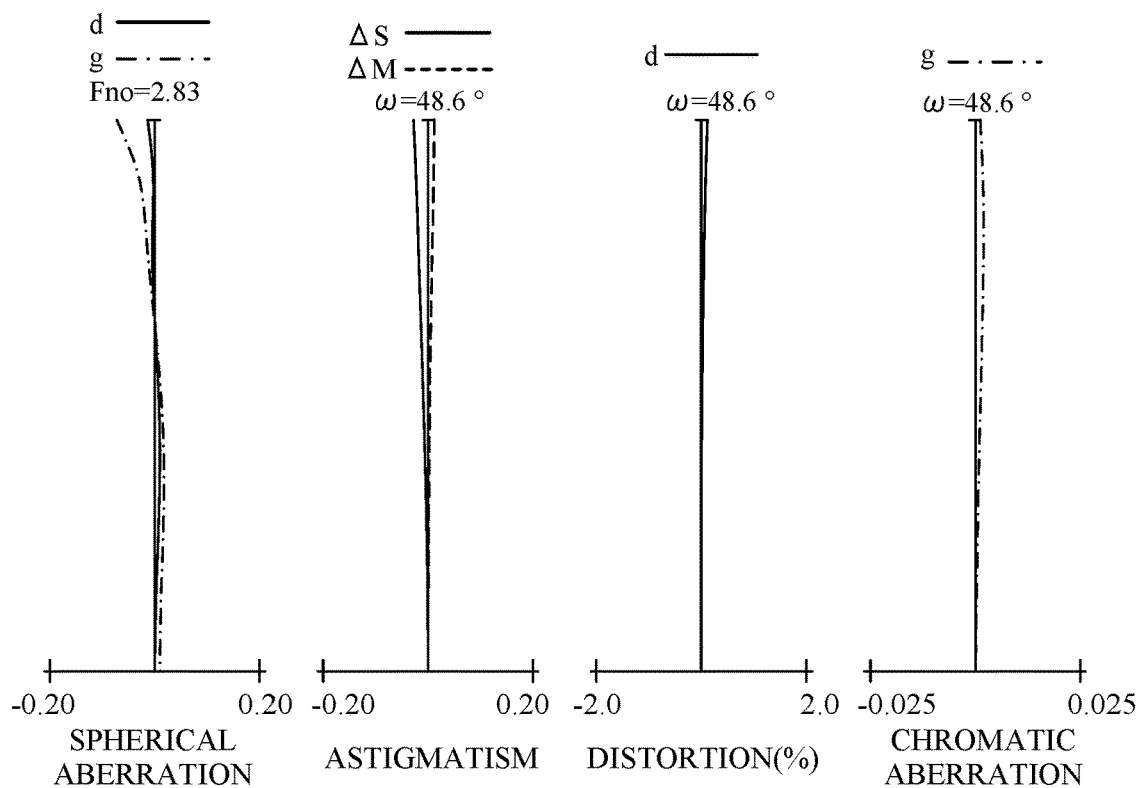
FIG. 3C is an aberration diagram according to Example 3 during focusing on infinity in the longest focal length state.
Figure 4A:
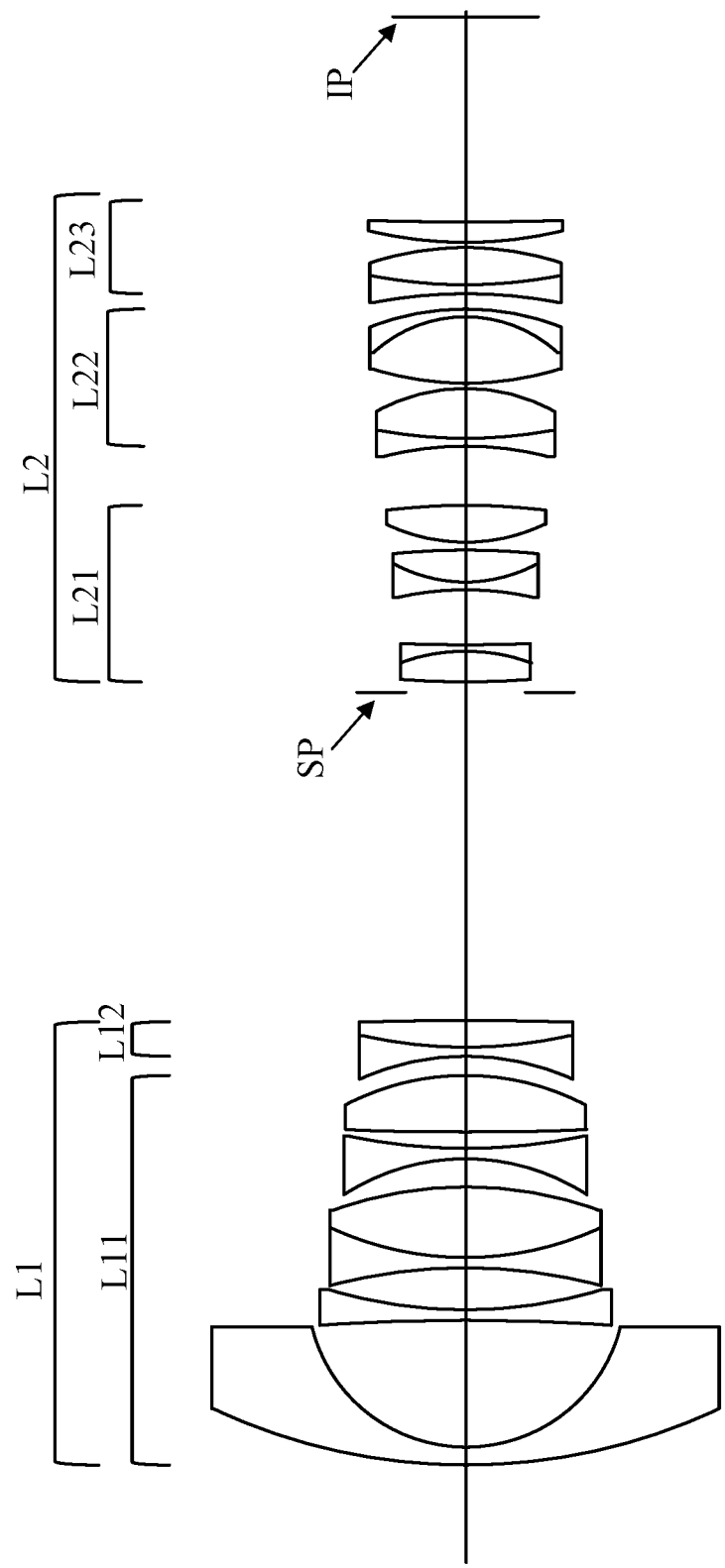
FIG. 4A is a lens sectional view according to Example 4 during focusing on infinity in the shortest focal length state.
Figure 4B:
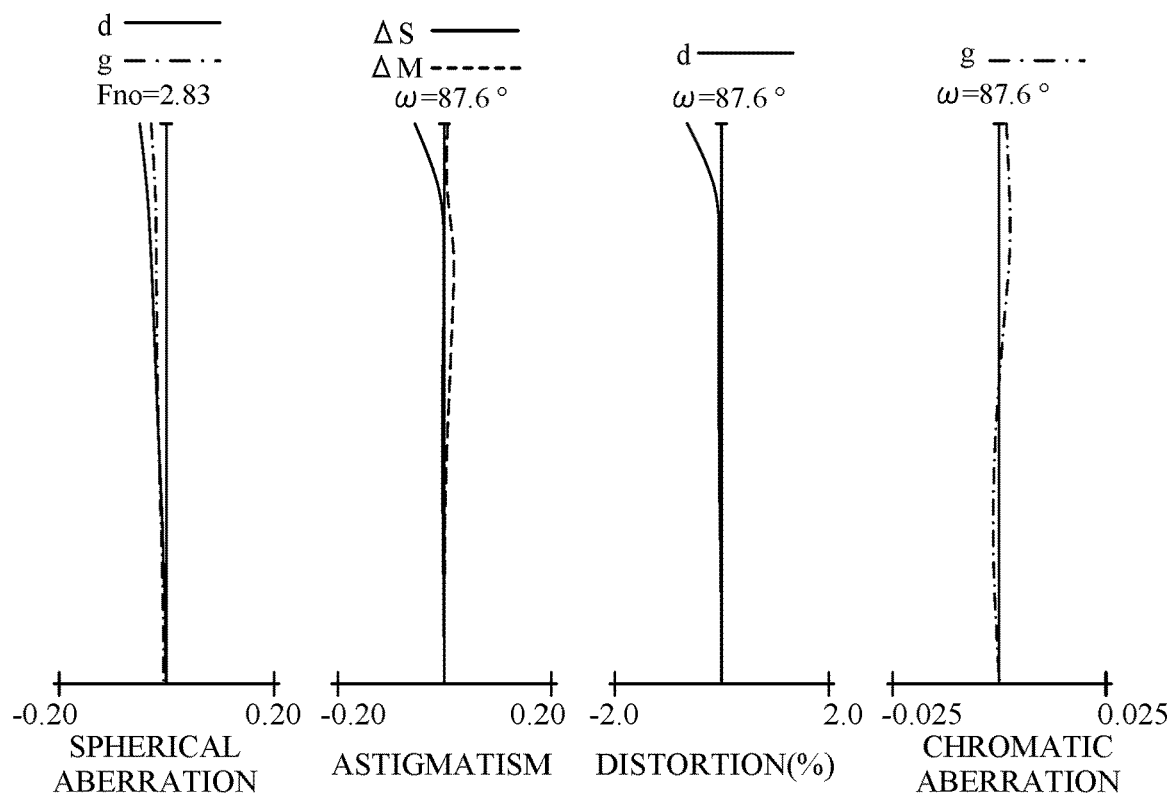
FIG. 4B is an aberration diagram according to Example 4 during focusing on infinity in the shortest focal length state.
Figure 4C:
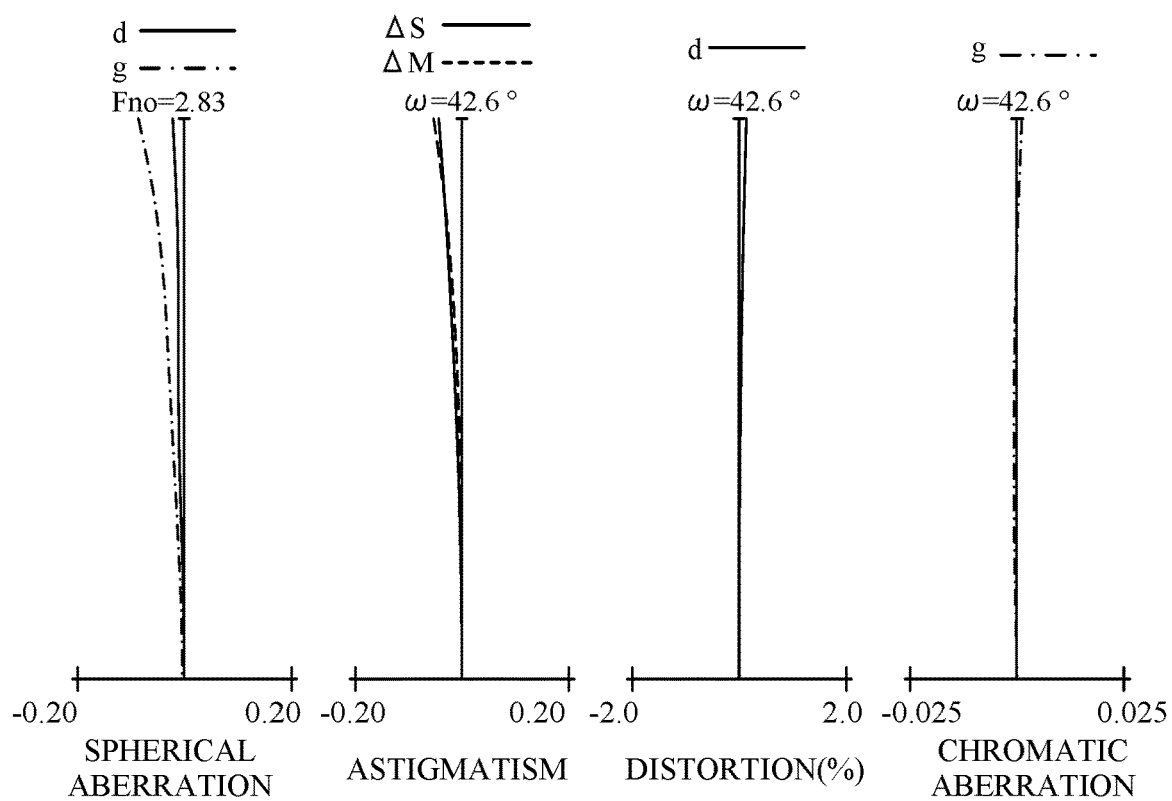
FIG. 4C is an aberration diagram according to Example 4 during focusing on infinity in the longest focal length state.

Referring now to the accompanying drawings, a description will be given of embodiments according to the present invention. Corresponding elements in respective figures will be designated by the same reference numerals, and a description thereof will be omitted.

FIGS. 1A, 2A, 3A, and 4A are lens sectional views of the zoom lenses according to Examples 1 to 4 during focusing on infinity in the shortest focal length state (at the wide-angle end), respectively. FIGS. 1B, 2B, 3B, and 4B are their aberration diagrams during focusing on infinity in the shortest focal length state. FIGS. 1C, 2C, 3C, and 4C are their aberration diagrams during focusing on infinity in the longest focal length state (at the telephoto end), respectively. The zoom lens according to each example can be used in an image pickup apparatus such as a digital video camera, a digital still camera, a broadcasting camera, a film-based camera, and a surveillance camera. The zoom lens according to each example can also be used as a projection optical system for a projection apparatus (projector).

In each lens section, the left side is the object side (front) and the right side is the image side (rear). In each lens sectional view, where "i" is the number of the lens units counted from the object side, Li represents an i-th lens unit. SP is an aperture stop (diaphragm). IP represents an image plane. The image plane IP corresponds to an imaging plane of an image sensor (photoelectric conversion element) such as a CCD sensor or a CMOS sensor when the zoom lens is used for the image pickup apparatus such as the digital video camera or the digital still camera. The image plane IP corresponds to a film plane when the zoom lens is used for the image pickup apparatus such as the film-based camera.

An optical block corresponding to an optical filter, a face plate, a low-pass filter, an infrared cutting filter, etc. may be disposed on the object side of the image plane IP.

In the spherical aberration diagram, Fno represents an F-number. Further, "d" represents a d-line (wavelength 587.6 nm) and "g" represents a g-line (wavelength 435.8 nm). In the astigmatism diagram, ΔM and ΔS are a meridional image plane and a sagittal image plane for the d-line, respectively. The distortion diagram illustrates a distortion amount for the d-line. The lateral chromatic aberration diagram illustrates a lateral chromatic aberration amount for the g-line. ω represents a half angle of view (degree).

The zoom lens according to each example includes, in order from the object side to the image side, a first lens unit L1 having a negative refractive power and a second lens unit L2 having a positive refractive power. During zooming, the distance between the first lens unit L1 and the second lens unit L2 changes.

The zoom lens according to each example satisfies the following conditional expression (1) where fw is a focal length of the overall system (zoom lens) in the shortest focal length state and Lw is an overall optical length (overall lens length) in the shortest focal length state:

$$0.010 < fw/Lw < 0.050 \tag{1}$$

If the overall optical length Lw becomes shorter and the value becomes higher than the upper limit of the conditional expression (1), the refractive power of each lens unit becomes strong and it becomes difficult to correct the aberration generated in each lens unit and to improve the image quality. If the overall optical length Lw becomes longer and the value becomes lower than the lower limit of the conditional expression (1), the number of lenses increases or the lens effective diameter becomes too large.

The numerical range of the conditional expression (1) may be set as in the following conditional expression (1a):

$$0.015 < fw/Lw < 0.048 \tag{1a}$$

The numerical range of conditional expression (1) may be set as in the following conditional expression (1b):

$$0.020 < fw/Lw < 0.045 \tag{1b}$$

The zoom lens according to each example satisfies the conditional expression (2) where m1 is a moving amount of the first lens unit L1 during zooming from the shortest focal length state to the longest focal length state and z is a magnification varying ratio (zoom ratio) of the entire system. Herein, the magnification varying ratio is a ratio of the focal length of the overall system in the shortest focal length state to the focal length of the entire system in the longest focal length state.

$$8.0 < m1/z < 40.0 \tag{2}$$

If the moving amount m1 of the first lens unit L1 is higher and the value becomes higher than the upper limit of the conditional expression (2), the zoom lens becomes too large. If the moving amount m1 of the first lens unit L1 becomes smaller and the value becomes lower than the lower limit of the conditional expression (2), the focal length of the first lens unit L1 becomes short and the aberration variation during zooming becomes large.

The numerical range of the conditional expression (2) may be set as in the following conditional expression (2a):

$$10.0 < m1/z < 38.0 \tag{2a}$$

The numerical range of conditional expression (2) may be set in the following conditional expression (2b):

$$11.0 < m1/z < 36.0 \tag{2b}$$

The zoom lens according to each example satisfies the following conditional expression (3) where f1 is a focal length of the first lens unit L1.

$$-3.5 < f1/fw < -0.8 \tag{3}$$

If the focal length f1 of the first lens unit L1 becomes shorter and the value becomes higher than the upper limit of the conditional expression (3), the off-axis aberration such as the distortion and the curvature of field deteriorate. If the focal length f1 of the first lens unit L1 becomes longer and the value becomes lower than the lower limit of the conditional expression (3), it becomes difficult to widen the angle of view.

The numerical range of conditional expression (3) may be set as in the following conditional expression (3a):

$$-3.2 < f1/fw < -1.2 \tag{3a}$$

The numerical range of the conditional expression (3) may be set as in the following conditional expression (3b):

$$-2.9 < f1/fw < -1.5 \tag{3b}$$

The above configuration can provide a zoom lens, an image pickup apparatus, and an imaging system, each of which has a wide angle of view and a high optical performance in the overall zoom range.

Next follows a description of conditions that the zoom lens according to each example may satisfy.

The zoom lens according to each example may satisfy the following conditional expression (4) where f2 is a focal length of the second lens unit L2:

$$3.5 < f2/fw < 10.0 \tag{4}$$

If the focal length f2 of the second lens unit L2 becomes longer and the value is higher than the upper limit of the conditional expression (4), the optical system becomes too large. If the focal length f2 of the second lens unit L2 becomes shorter and the value becomes lower than the lower limit of the conditional expression (4), it becomes difficult to correct the spherical aberration, the coma, and the curvature of field.

The numerical range of the conditional expression (4) may be set as in the following conditional expression (4a):

$$4.2 < f2/fw < 8.8 \tag{4a}$$

The numerical range of the conditional expression (4) may be set as in the following conditional expression (4b).

$$4.5 < f2/fw < 7.5 \tag{4b}$$

In the zoom lens of each example, the first lens unit L1 includes, in order from the object side to the image side, an eleventh sub lens unit (first partial lens unit) L11, a twelfth sub lens unit L12 (second partial lens unit). At this time, the twelfth sub lens unit L12 may move in the optical axis direction during focusing. In order to perform quick autofocus, the inner lens focus may be used with a lens unit having a smaller diameter.

The zoom lens according to each example may satisfy the following conditional expression (5) where f1b is a focal length of the twelfth sub lens unit L12:

$$-20.0 < f1b/fw < -6.0 \tag{5}$$

If the focal length f1b of the twelfth sub-lens unit L12 becomes longer and the value becomes higher than the upper limit of conditional expression (5), the moving amount during focusing becomes large and the aberration variation becomes large. If the focal length f1b of the twelfth sub-lens unit L12 becomes shorter and the value becomes lower than the lower limit of the conditional expression (5), the spherical aberration and the coma generated in the twelfth sub lens unit L12 increase, which makes it difficult to improve the image quality.

The numerical range of the conditional expression (5) may be set as in the following conditional expression (5a):

$$-19.2 < f1b/fw < -6.5 \tag{5a}$$

The numerical range of the conditional expression (5) may be set as in the following conditional expression (5b):

$$-18.5 < f1b/fw < -8.0 \quad (5b)$$

The zoom lens according to each example may satisfy the following conditional expression (6) when fG1n is a focal length of the negative lens G1n disposed closest to the object side among negative lenses included in the zoom lens.

$$-7.0 < fG1n/fw < -2. \quad (6)$$

If the focal length fG1n of the negative lens G1n becomes shorter and the value is higher than the upper limit of the conditional expression (6), large amounts of the curvature of field and astigmatism will occur, making it difficult to achieve the high image quality. If the focal length of the negative lens G1n becomes longer and the value becomes lower than the lower limit of conditional expression (6), it becomes difficult to widen the angle of view.

The numerical range of the conditional expression (6) may be set as in the following conditional expression (6a):

$$-6.0 < fG1n/fw < -3.5 \quad (6a)$$

The numerical range of the conditional expression (6) may be set as in the following conditional expression (6b):

$$-5.5 < fG1n/fw < -4.0 \quad (6b)$$

The zoom lens according to each example may satisfy the following conditional expression (7) when fG1p is a focal length of the positive lens G1p disposed closest to the object side among positive lenses included in the zoom lens.

$$2.0 < fG1p/fw < 6.2 \quad (7)$$

If the focal length fG1p of the positive lens G1p becomes longer and the value becomes higher than the upper limit of conditional expression (7), the field curvature, the astigmatism, and the lateral chromatic aberration generated by the negative lens cannot be sufficiently corrected. If the focal length fG1p of the positive lens G1p becomes shorter and the value becomes lower than the lower limit of the conditional expression (7), the field curvature, the astigmatism, and the lateral chromatic aberration generated by the negative lens are overcorrected, and it becomes difficult to improve the image quality.

The numerical range of the conditional expression (7) may be set as in the following conditional expression (7a):

$$2.4 < fG1p/fw < 6.0 \quad (7a)$$

The numerical range of the conditional expression (7) may be set as in the following conditional expression (7b):

$$2.9 < fG1p/fw < 5.5 \quad (7b)$$

In the zoom lens according to each example, the first lens unit L1 may have four or more negative lenses and two or more positive lenses. When the first lens unit L1 has four or more negative lenses, it is possible to distribute the negative refractive power of the first lens unit L1 and to suppress the distortion and the curvature of field. When the first lens unit L1 has two or more positive lenses, it is possible to correct the distortion, the curvature of field, and the lateral chromatic aberration generated from the negative lens of the first lens unit L1. The first lens unit L1 may include, in order from the object side to the image side, a negative lens G1, a negative lens G2, a negative lens G3, a positive lens G4, a negative lens G5, a positive lens G6, and a negative lens G7.

In the zoom lens according to each example, the second lens unit L2 may include, in order from the object side to the image side, a twenty-first sub lens unit (third partial lens unit) L21 and a twenty-second sub lens unit (fourth partial lens unit) L22. At this time, the distance between the twenty-first sub lens unit L21 and the twenty-second sub lens unit L22 may change during zooming. The second lens unit L2 may include, in order from the object side to the image side, a twenty-first sub lens unit (third partial lens unit) L21, a twenty-second sub lens unit (fourth partial lens unit) L22, and a twenty-third sub lens unit (fifth partial lens unit) L23. At this time, the distance between the sub lens units adjacent to each other may change during zooming. Due to this configuration, it becomes possible to correct the curvature of field and the astigmatism.

In the zoom lens according to each example, the following conditional expression (8) may be satisfied where ωw is a half angle of view in the shortest focal length state:

$$50.0° < \omega w \quad (8)$$

If the half angle of view ωw becomes smaller than the range of the conditional expression (8), the wide angle of view cannot be achieved.

The numerical range of conditional expression (8) may be set as in the conditional expression (8a):

$$70.0° < \omega w \quad (8a)$$

The numerical range of the conditional expression (8) may be set as in the following conditional expression (8b):

$$80.0° < \omega w \quad (8b)$$

A specific description will be given of the configuration of the zoom lens according to each example. The zoom lens according to each example includes, in order from the object side to the image side, a first lens unit L1 having a negative refractive power and a second lens unit L2 having a positive refractive power. The distance between the first lens unit L1 and the second lens unit L2 changes during zooming. The first lens unit L1 includes, in order from the object side to the image side, an eleventh sub lens unit L11 and a twelfth sub lens unit L12. The twelfth sub lens unit L12 moves in the optical axis direction during focusing.

In the zoom lenses according to Examples 1, 2, and 4, the first lens unit L1 has five negative lenses and three positive lenses. In the zoom lens according to Example 3, the first lens unit L1 has five negative lenses and two positive lenses. In the zoom lens according to each example, the first lens unit L1 includes, in order from the object side to the image side, the negative lens G1, the negative lens G2, the negative lens G3, the positive lens G4, the negative lens G5, the positive lens G6, and the negative lens G7.

In the zoom lens according to Example 2, the second lens unit L2 includes, in order from the object side to the image side, a twenty-first sub lens unit L21 and a twenty-second sub lens unit L22 and the distance between the twenty-first sub-lens unit L21 and the twenty-second sub lens unit during zooming changes. In the zoom lens according to Example 4, the second lens unit L2 includes, in order from the object side to the image side, a twenty-first sub lens unit L21, a twenty-second sub lens unit L22, and a twenty-third sub lens unit L23 and the distance between the sub lens units adjacent to each other changes during zooming.

The following are specific numerical data according to Numerical Examples 1 to 4 corresponding to Examples 1 to 4, respectively. In each numerical example, "i" represents the number counted from the object side, ri represents a radius of curvature of the i-th optical surface (i-th surface), di represents an axial distance between an i-th surface and an (i+1)-th surface. Further, ndi and vdi are the refractive index and the Abbe number of the material of the i-th optical element for the d-line, respectively. The Abbe number νd of a certain material is given as follows where Nd, NF, NC, and Ng are the refractive indexes for d-line (587.6 nm), F-line (486.1 nm), C-line (656.3 nm), g-line (wavelength 435.8 nm) of the Fraunhofer line:

$$\nu d = (Nd-1)/(NF-NC)$$

In each numerical example, all of "d," the focal length (mm), the F-number, and the half angle of view (degree) have values when the optical system according to each example focuses on an object at infinity. "BF (backfocus)" is expressed by converting into air a distance on the optical axis from the final lens surface (lens surface closest to the image side) to the paraxial image plane. The "overall lens length" is a length obtained by adding the backfocus to the distance on the optical axis from the frontmost surface (lens surface closest to the object) to the final surface of the zoom lens. The "lens unit" is not limited to a plurality of lenses, and may include only a single lens.

When the optical surface is aspherical, a symbol * is added to the right of the surface number. The aspherical shape is expressed as follows:

$$x = (h^2/R)/[1+\{1-(1+k)(h/R)^2\}^{1/2}] + A4 \times h^4 + A6 \times h^6 + A8 \times h^8 + A10 \times h^8 + A12 \times h^{12}$$

where x is a displacement amount from a surface vertex in the optical axis direction, h is a height from the optical axis in a direction orthogonal to the optical axis, R is a paraxial radius of curvature, and k is a conic constant, A4, A6, A8, A10, and A12 are aspheric coefficients of respective orders, "e±XX" in each aspheric coefficient means "×10$^{\pm XX}$".

Table 1 shows the relationship between each of the above conditional expressions and numerical examples.

Numerical Example 1

UNIT mm

Surface data

| surface number | r | d | nd | vd |
|---|---|---|---|---|
| 1 | 108.662 | 3.50 | 1.91082 | 35.3 |
| 2 | 32.500 | 23.66 | | |
| 3 | 398.271 | 2.10 | 1.59282 | 68.6 |
| 4 | 64.454 | 10.72 | | |
| 5 | −84.065 | 2.00 | 1.59522 | 67.7 |
| 6 | 41.252 | 15.88 | 1.76200 | 40.1 |
| 7 | −66.249 | 3.08 | | |
| 8 | −48.343 | 2.20 | 1.59522 | 67.7 |
| 9 | 46.899 | 2.64 | | |
| 10* | 67.951 | 9.40 | 1.57501 | 41.5 |
| 11 | −124.361 | 5.19 | | |
| 12 | −68.304 | 1.80 | 1.59522 | 67.7 |
| 13 | 133.428 | 4.36 | 1.76200 | 40.1 |
| 14 | −385.931 | (variable) | | |
| 15(diaphragm) | ∞ | 2.00 | | |
| 16 | 493.304 | 5.45 | 1.95375 | 32.3 |
| 17 | −46.058 | 1.40 | 1.92286 | 18.9 |
| 18 | −656.581 | 5.44 | | |
| 19 | −629.120 | 1.75 | 1.95375 | 32.3 |
| 20 | 30.714 | 6.20 | 1.85896 | 22.7 |
| 21 | −313.967 | 1.55 | | |
| 22 | 32.711 | 7.96 | 1.45600 | 90.3 |
| 23* | −101.745 | 12.10 | | |
| 24 | −46.600 | 1.40 | 1.77250 | 49.6 |
| 25 | 68.661 | 10.35 | 1.43875 | 94.7 |
| 26 | −32.683 | 0.80 | | |
| 27 | 67.058 | 12.37 | 1.43875 | 94.7 |
| 28 | −25.793 | 1.80 | 1.72916 | 54.7 |

-continued

UNIT mm

| | | | | |
|---|---|---|---|---|
| 29 | −65.607 | 3.00 | | |
| 30 | −110.632 | 1.90 | 1.77250 | 49.6 |
| 31 | 110.632 | 7.43 | 1.43875 | 94.7 |
| 32 | −59.558 | 1.00 | | |
| 33 | 84.489 | 4.37 | 1.59349 | 67.0 |
| 34 | −2825.008 | (variable) | | |
| image plane | ∞ | | | |

ASPHERIC DATA
Tenth surface

K = 0.00000e+000  A 4 = 7.78151e−007  A 6 = 2.96474e−009
A 8 = −9.89601e−012  A10 = 1.96147e−014  A12 = −1.33549e−017

Twenty-third surface

K = 0.00000e+000  A 4 = 2.04982e−006  A 6 = −1.13140e−009
A 8 = 4.59318e−012  A10 = −2.39441e−014  A12 = 3.57540e−017

VARIOUS DATA
Zoom ratio 1.89

| | Wide | Telephoto |
|---|---|---|
| Focal length | 10.77 | 20.39 |
| F-number | 2.59 | 2.83 |
| Half angle of view | 87.70 | 42.56 |
| Image height | 14.82 | 14.82 |
| overall lens length | 271.70 | 247.50 |
| BF | 41.59 | 67.97 |
| d14 | 55.30 | 4.73 |
| d34 | 41.59 | 67.97 |

ZOOM LENS UNIT DATA

| Unit | Starting surface | Focal length |
|---|---|---|
| L1 | 1 | −20.52 |
| L1a | 1 | −29.90 |
| L1b | 12 | −184.44 |
| L2 | 15 | 56.27 |

SINGLE LENS DATA

| Lens | Starting surface | Focal length |
|---|---|---|
| 1 | 1 | −52.05 |
| 2 | 3 | −130.02 |
| 3 | 5 | −46.22 |
| 4 | 6 | 35.64 |
| 5 | 8 | −39.65 |
| 6 | 10 | 77.81 |
| 7 | 12 | −75.65 |
| 8 | 13 | 130.59 |
| 9 | 16 | 44.39 |
| 10 | 17 | −53.73 |
| 11 | 19 | −30.66 |
| 12 | 20 | 32.84 |
| 13 | 22 | 55.31 |
| 14 | 24 | −35.75 |
| 15 | 25 | 52.09 |
| 16 | 27 | 44.25 |
| 17 | 28 | −59.42 |
| 18 | 30 | −71.34 |
| 19 | 31 | 89.43 |
| 20 | 33 | 138.30 |

Numerical Example 2

UNIT mm

Surface data

| surface number | r | d | nd | vd |
|---|---|---|---|---|
| 1 | 112.398 | 3.50 | 2.00100 | 29.1 |
| 2 | 33.121 | 26.50 | | |
| 3 | −362.128 | 2.10 | 1.43875 | 94.9 |
| 4 | 62.134 | 12.98 | | |
| 5 | −63.115 | 2.00 | 1.49700 | 81.5 |
| 6 | 88.525 | 15.24 | 1.65412 | 39.7 |
| 7 | −54.312 | 3.60 | | |
| 8 | −40.632 | 2.20 | 1.43875 | 94.9 |
| 9 | 83.071 | 3.01 | | |
| 10* | 124.966 | 15.23 | 1.51823 | 58.9 |
| 11 | −45.291 | 2.91 | | |
| 12 | −51.763 | 1.80 | 1.49700 | 81.5 |
| 13 | 90.976 | 6.35 | 1.53172 | 48.8 |
| 14 | 3413.946 | (variable) | | |
| 15(diaphragm) | ∞ | 2.00 | | |
| 16 | 32.361 | 7.81 | 1.67790 | 55.3 |
| 17 | −2327.857 | 1.54 | | |
| 18 | −104.285 | 1.75 | 1.92286 | 18.9 |
| 19 | 43.418 | 6.02 | 1.92286 | 18.9 |
| 20 | −104.665 | 5.85 | | |
| 21 | 138.822 | 2.06 | 1.88300 | 40.8 |
| 22* | 49.985 | (variable) | | |
| 23 | 197.152 | 1.40 | 2.00100 | 29.1 |
| 24 | 61.397 | 7.96 | 1.43875 | 94.7 |
| 25 | −51.412 | 0.80 | | |
| 26 | 62.041 | 11.01 | 1.43875 | 94.7 |
| 27 | −23.264 | 1.80 | 1.80400 | 46.6 |
| 28 | 237.457 | 3.58 | | |
| 29 | 894.661 | 10.80 | 1.59349 | 67.0 |
| 30 | −30.773 | (variable) | | |
| image plane | ∞ | | | |

ASPHERIC DATA
Tenth surface

K = 0.00000e+000 A 4 = 4.57740e−007 A 6 = 1.38703e−010
A 8 = −3.92146e−013 A10 = 2.01577e−016 A12 = −1.03983e−019

Twenty-second surface

K = 0.00000e+000 A 4 = 7.01849e−006 A 6 = 1.46613e−008
A 8 = −6.99691e−011 A10 = 4.55025e−013 A12 = −8.22680e−016

VARIOUS DATA
Zoom ratio 1.67

| | Wide | Telephoto |
|---|---|---|
| Focal length | 10.77 | 18.00 |
| F-number | 2.56 | 2.83 |
| Half angle of view | 87.01 | 48.57 |
| Image height | 14.82 | 14.82 |
| overall lens length | 284.82 | 248.29 |
| BF | 37.99 | 54.59 |
| d14 | 77.78 | 20.70 |
| d22 | 7.25 | 11.21 |
| d30 | 37.99 | 54.59 |

ZOOM LENS UNIT DATA

| Unit | Starting surface | Focal length |
|---|---|---|
| L1 | 1 | −25.50 |
| L1a | 1 | −117.92 |
| L1b | 12 | −106.62 |
| L2 | 15 | 61.18 |
| L2a | 15 | 74.96 |
| L2b | 23 | 72.65 |

SINGLE LENS DATA

| Lens | Starting surface | Focal length |
|---|---|---|
| 1 | 1 | −47.97 |
| 2 | 3 | −120.69 |
| 3 | 5 | −73.81 |
| 4 | 6 | 53.73 |
| 5 | 8 | −61.85 |
| 6 | 10 | 66.17 |
| 7 | 12 | −66.11 |
| 8 | 13 | 175.67 |
| 9 | 16 | 47.15 |
| 10 | 18 | −33.03 |
| 11 | 19 | 33.92 |
| 12 | 21 | −89.43 |
| 13 | 23 | −89.54 |
| 14 | 24 | 65.18 |
| 15 | 26 | 40.14 |
| 16 | 27 | −26.27 |
| 17 | 29 | 50.35 |

Numerical Example 3

UNIT mm

Surface data

| surface number | r | d | nd | vd |
|---|---|---|---|---|
| 1 | 116.419 | 3.50 | 2.00100 | 29.1 |
| 2 | 35.306 | 28.72 | | |
| 3 | −215.073 | 2.10 | 1.80400 | 46.6 |
| 4 | 111.221 | 9.07 | | |
| 5 | −110.439 | 2.50 | 1.49700 | 81.6 |
| 6 | 66.719 | 18.20 | 1.67270 | 32.1 |
| 7 | −73.678 | 9.29 | | |
| 8 | −42.924 | 2.20 | 1.43875 | 94.9 |
| 9 | 148.482 | 19.51 | | |
| 10* | −1258.702 | 10.77 | 1.71700 | 47.9 |
| 11 | −55.083 | 3.19 | | |
| 12 | −71.188 | 2.00 | 1.71300 | 53.9 |
| 13 | −421.392 | (variable) | | |
| 14(diaphragm) | ∞ | 2.00 | | |
| 15 | 165.035 | 6.57 | 1.88300 | 40.8 |
| 16 | −51.368 | 1.40 | 1.84666 | 23.8 |
| 17 | 360.853 | 23.50 | | |
| 18 | 133.157 | 1.75 | 1.90366 | 31.3 |
| 19 | 26.666 | 9.16 | 1.84666 | 23.8 |
| 20 | 326.109 | 1.81 | | |
| 21 | 35.298 | 10.03 | 1.45600 | 90.3 |
| 22* | −148.006 | 12.10 | | |
| 23 | −56.390 | 1.40 | 1.80400 | 46.6 |
| 24 | 53.155 | 12.70 | 1.43875 | 94.9 |
| 25 | −34.318 | 0.80 | | |
| 26 | 57.884 | 13.39 | 1.43875 | 94.9 |
| 27 | −28.995 | 1.80 | 1.62004 | 36.3 |
| 28 | −56.988 | 3.00 | | |
| 29 | −53.308 | 1.90 | 1.88300 | 40.8 |
| 30 | 53.308 | 11.14 | 1.43875 | 94.9 |
| 31 | −94.185 | 1.00 | | |
| 32 | 60.939 | 10.98 | 1.57501 | 41.5 |
| 33 | −632.787 | (variable) | | |
| image plane | ∞ | | | |

-continued

UNIT mm

ASPHERIC DATA
Tenth surface

K = 0.00000e+000 A 4 = −1.16416e−007 A 6 = 7.57343e−011
A 8 = −2.53467e−013 A10 = 2.46726e−016 A12 = −1.02114e−019

Twenty-second surface

K = 0.00000e+000 A 4 = 1.16328e−006 A 6 = −1.32798e−009
A 8 = 3.83457e−012 A10 = −9.48246e−015 A12 = 7.94774e−018

VARIOUS DATA
Zoom ratio 1.67

|  | Wide | Telephoto |
| --- | --- | --- |
| Focal length | 10.77 | 18.00 |
| F-number | 2.65 | 2.83 |
| Half angle of view | 87.68 | 48.55 |
| Image height | 14.82 | 14.82 |
| overall lens length | 355.07 | 297.29 |
| BF | 23.31 | 41.60 |
| d13 | 94.29 | 18.22 |
| d33 | 23.31 | 41.60 |

ZOOM LENS UNIT DATA

| Unit | Starting surface | Focal length |
| --- | --- | --- |
| L1 | 1 | −28.40 |
| L1a | 1 | −494.72 |
| L1b | 12 | −120.42 |
| L2 | 14 | 71.83 |

SINGLE LENS DATA

| Lens | Starting surface | Focal length |
| --- | --- | --- |
| 1 | 1 | −51.74 |
| 2 | 3 | −90.92 |
| 3 | 5 | −83.30 |
| 4 | 6 | 54.91 |
| 5 | 8 | −75.63 |
| 6 | 10 | 80.04 |
| 7 | 12 | −120.42 |
| 8 | 15 | 45.01 |
| 9 | 16 | −53.03 |
| 10 | 18 | −37.19 |
| 11 | 19 | 33.83 |
| 12 | 21 | 63.59 |
| 13 | 23 | −33.84 |
| 14 | 24 | 49.73 |
| 15 | 26 | 46.20 |
| 16 | 27 | −97.60 |
| 17 | 29 | −29.94 |
| 18 | 30 | 79.42 |
| 19 | 32 | 97.23 |

Numerical Example 4

UNIT mm
Surface data

| surface number | r | d | nd | vd |
| --- | --- | --- | --- | --- |
| 1 | 121.007 | 3.50 | 1.91082 | 35.3 |
| 2 | 32.263 | 26.06 |  |  |
| 3 | −373.012 | 2.10 | 1.85150 | 40.8 |
| 4 | 94.277 | 8.61 |  |  |
| 5 | −107.334 | 2.00 | 1.59522 | 67.7 |
| 6 | 64.854 | 14.45 | 1.88300 | 40.8 |
| 7 | −78.886 | 5.71 |  |  |
| 8 | −45.365 | 2.20 | 1.59522 | 67.7 |
| 9 | 116.053 | 3.48 |  |  |
| 10* | 1432.742 | 11.45 | 1.77250 | 49.6 |
| 11 | −51.451 | 3.88 |  |  |
| 12 | −53.080 | 1.80 | 1.59522 | 67.7 |
| 13 | 97.078 | 5.25 | 1.80400 | 46.6 |
| 14 | −2237.484 | (variable) |  |  |
| 15(diaphragm) | ∞ | 2.00 |  |  |
| 16 | 145.083 | 6.25 | 1.90366 | 31.3 |
| 17 | −38.620 | 1.40 | 1.80810 | 22.8 |
| 18 | 363.948 | 11.12 |  |  |
| 19 | −69.112 | 1.75 | 1.80400 | 46.6 |
| 20 | 30.912 | 6.35 | 1.72825 | 28.5 |
| 21 | −163.245 | 1.60 |  |  |
| 22 | 35.621 | 7.70 | 1.49700 | 81.5 |
| 23* | −100.029 | (variable) |  |  |
| 24 | −66.247 | 1.40 | 1.83481 | 42.7 |
| 25 | 89.240 | 10.45 | 1.43875 | 94.7 |
| 26 | −36.902 | 0.80 |  |  |
| 27 | 60.716 | 13.60 | 1.43875 | 94.7 |
| 28 | −27.559 | 1.80 | 1.88300 | 40.8 |
| 29 | −51.454 | (variable) |  |  |
| 30 | −106.874 | 1.90 | 1.77250 | 49.6 |
| 31 | 106.874 | 7.60 | 1.43875 | 94.7 |
| 32 | −60.437 | 1.00 |  |  |
| 33 | 80.316 | 4.15 | 1.59349 | 67.0 |
| 34 | 552.233 | (variable) |  |  |
| image plane | ∞ |  |  |  |

ASPHERIC DATA
Tenth surface

K = 0.00000e+000 A 4 = 7.56914e−007 A 6 = 1.91191e−010
A 8 = −1.36602e−014 A10 = 3.98716e−017 A12 = −1.39781e−019

Twenty-third surface

K = 0.00000e+000 A 4 = 3.50876e−006 A 6 = −6.28868e−010
A 8 = −2.40355e−012 A10 = 3.48706e−015 A12 = −9.82999e−019

VARIOUS DATA
Zoom ratio 1.89

|  | Wide | Telephoto |
| --- | --- | --- |
| Focal length | 10.77 | 20.39 |
| F-number | 2.53 | 2.83 |
| Half angle of view | 87.64 | 42.56 |
| Image height | 14.82 | 14.82 |
| overall lens length | 295.87 | 258.22 |
| BF | 42.04 | 42.04 |
| d14 | 67.36 | 4.76 |
| d23 | 12.10 | 12.32 |
| d29 | 3.00 | 27.72 |
| d34 | 42.04 | 42.04 |

ZOOM LENS UNIT DATA

| Unit | Starting surface | Focal length |
| --- | --- | --- |
| L1 | 1 | −26.73 |
| L1a | 1 | −85.91 |
| L1b | 12 | −115.44 |
| L2 | 15 | 59.43 |
| L2a | 15 | 65.52 |
| L2b | 24 | 167.74 |
| L2c | 30 | 245.12 |

SINGLE LENS DATA

| Lens | Starting surface | Focal length |
| --- | --- | --- |
| 1 | 1 | −49.22 |
| 2 | 3 | −88.20 |
| 3 | 5 | −67.63 |
| 4 | 6 | 42.30 |
| 5 | 8 | −54.52 |
| 6 | 10 | 64.51 |

-continued

UNIT mm

| | | |
|---|---|---|
| 7 | 12 | −57.40 |
| 8 | 13 | 115.84 |
| 9 | 16 | 34.31 |
| 10 | 17 | −43.14 |
| 11 | 19 | −26.36 |
| 12 | 20 | 36.19 |
| 13 | 22 | 53.87 |
| 14 | 24 | −45.36 |
| 15 | 25 | 61.04 |
| 16 | 27 | 45.33 |
| 17 | 28 | −69.67 |
| 18 | 30 | −68.91 |
| 19 | 31 | 89.23 |
| 20 | 33 | 157.84 |

TABLE 1

| | Numerical Example 1 | Numerical Example 2 | Numerical Example 3 | Numerical Example 4 |
|---|---|---|---|---|
| Conditional Expression (1) | 0.040 | 0.038 | 0.030 | 0.036 |
| Conditional Expression (2) | 12.8 | 21.9 | 34.6 | 19.9 |
| Conditional Expression (3) | −1.9 | −2.4 | −2.6 | −2.4 |
| Conditional Expression (4) | 5.2 | 5.7 | 6.7 | 5.5 |
| Conditional Expression (5) | −17.1 | −9.9 | −11.2 | −10.7 |
| Conditional Expression (6) | −4.8 | −4.5 | −4.8 | −4.6 |
| Conditional Expression (7) | 3.3 | 5.0 | 5.1 | 3.9 |
| Conditional Expression (8) | 87.7 | 87.0 | 88.5 | 87.6 |

Image Pickup Apparatus

Figure 5:
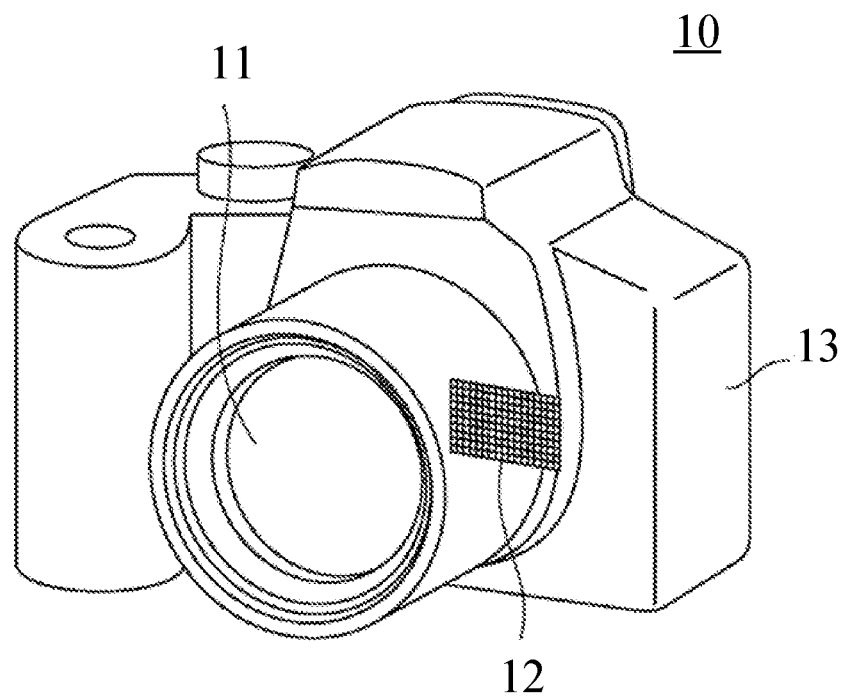
FIG. 5 is a schematic view of principal part of an image pickup apparatus of the present invention.

Referring now to FIG. 5, a description will be given of an embodiment of a digital still camera (image pickup apparatus) using the zoom lens according to the present invention as an image pickup optical system. FIG. 5 is a schematic view of principal part of the image pickup apparatus according to the present invention. In FIG. 5, reference numeral 10 denotes a camera body, and reference numeral 11 denotes an image pickup optical system including any of the zoom lenses described in Examples 1 to 4. Reference numeral 12 denotes an image sensor (photoelectric conversion element), such as a CCD sensor or a CMOS sensor which is built in the camera body, receives an optical image formed by the image pickup optical system 11, and photoelectrically converts it. The camera body 10 may be a so-called single lens reflex camera having a quick turn mirror or a so-called mirrorless camera having no quick turn mirror.

By thus applying the zoom lens according to the present invention to an image pickup apparatus such as a digital still camera, it is possible to obtain an image pickup apparatus having a small overall length, a small lens system, and a high focusing performance.

Image Pickup System

An image pickup system (surveillance camera system) may be formed which includes the zoom lens according to each example and a controller that controls the zoom lens. In this case, the controller can control the zoom lens so that each lens unit moves as described above during zooming, focusing and image stabilizations. At this time, the controller does not have to be configured integrally with the zoom lens, and the controller may be configured separately from the zoom lens. For example, a configuration may be adopted in which a controller (control apparatus) remotely disposed from a driver that drives each lens in the zoom lens may include a transmitter that sends a control signal (command) for controlling the zoom lens. Due to this controller, the zoom lens can be remotely operated.

Alternatively, the controller provided with an operation unit, such as a remote controller or a button, for remotely operating the zoom lens may control the zoom lens according to an input to the operation unit by the user. For example, a magnifying button and a reducing button are provided as the operation unit and the controller may be configured to send a signal to the driver such that when the user presses the magnifying button, the magnification of the zoom lens increases, and when the user presses the reducing button, the magnification of the zoom lens decreases.

The image pickup system may have a display unit such as a liquid crystal panel for displaying zoom information (moving state) of the zoom lens. The zoom information (information on the zoom) of the zoom lens is, for example, the zoom magnification (zoom state) and the moving amount (moving state) of each lens unit. In this case, the user can remotely operate the zoom lens via the operation unit while viewing the zoom information of the zoom lens displayed on the display unit. At this time, the display unit and the operation unit may be integrated with each other by adopting, for example, a touch panel.

The above examples can provide a zoom lens, an image pickup apparatus, and an image pickup system, each of which has a wide angle of view and a high optical performance in the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-139470, filed on Jul. 30, 2019, which is hereby incorporated by reference herein in its entirety.

What is claimed is:

1. A zoom lens comprising, in order from an object side to an image side, a first lens unit having a negative refractive power and a second lens unit having a positive refractive power, a distance between the first lens unit and the second lens unit changing during zooming,
wherein the following conditional expressions are satisfied:

$$0.010 < fw/Lw < 0.050,$$

$$8.0 < m1/z < 40.0, \text{ and}$$

$$-3.5 < f1/fw < -0.8$$

where fw is a focal length of the zoom lens at a wide-angle end, Lw is an overall optical length at the wide-angle end, m1 is a moving amount of the first lens unit during zooming from the wide-angle end to a telephoto end, z is a magnification varying ratio of the zoom lens, and f1 is a focal length of the first lens unit.

2. The zoom lens according to claim 1, wherein the following conditional expression is satisfied:

$$3.5 < f2/fw < 10.0$$

where f2 is a focal length of the second lens unit.

3. The zoom lens according to claim 1, wherein the first lens unit includes, in order from the object side to the image side, a first partial lens unit and a second partial lens unit, and wherein the second partial lens unit moves in an optical axis direction during focusing.

4. The zoom lens according to claim 3, wherein the following conditional expression is satisfied:

$$-20.0 < f1b/fw < -6.0$$

where f1b is a focal length of the second partial lens unit.

5. The zoom lens according to claim 1, wherein the following conditional expression is satisfied:

$$-7.0 < fG1n/fw < -2.0$$

where fG1n is a focal length of a negative lens disposed closest to the object side among negative lenses included in the zoom lens.

6. The zoom lens according to claim 1, wherein the following conditional expression is satisfied:

$$2.0 < fG1p/fw < 6.2$$

where fG1p is a focal length of a positive lens disposed closest to the object side among positive lenses included in the zoom lens.

7. The zoom lens according to claim 1, wherein the first lens unit includes four or more negative lenses and two or more positive lenses.

8. The zoom lens according to claim 1, wherein the first lens unit includes, in order from the object side to the image side, a negative lens, a negative lens, a negative lens, a positive lens, a negative lens, a positive lens, and a negative lens.

9. The zoom lens according to claim 1, wherein the second lens unit includes, in order from the object side to the image side, a third partial lens unit and a fourth partial lens unit, and wherein a distance between the third partial lens unit and the fourth partial lens unit changes during zooming.

10. The zoom lens according to claim 1, wherein the second lens unit includes, in order from the object side to the image side, a third partial lens unit, a fourth partial lens unit, and a fifth partial lens unit, and wherein a distance between adjacent partial lens units changes during zooming.

11. The zoom lens according to claim 1, wherein the following conditional expression is satisfied:

$$50.0° < \omega w$$

where $\omega w$ is a half angle of view at the wide-angle end.

12. An image pickup apparatus comprising:

a zoom lens; and an image sensor configured to receives an image formed by the zoom lens, wherein the zoom lens includes, in order from an object side to an image side, a first lens unit having a negative refractive power and a second lens unit having a positive refractive power, a distance between the first lens unit and the second lens unit changing during zooming, and wherein the following conditional expressions are satisfied:

$$0.010 < fw/Lw < 0.050,$$

$$8.0 < m1/z < 40.0, \text{ and}$$

$$-3.5 < f1/fw < -0.8$$

where fw is a focal length of the zoom lens at a wide-angle end, Lw is an overall optical length at the wide-angle end, m1 is a moving amount of the first lens unit during zooming from the wide-angle end to a telephoto end, z is a magnification varying ratio of the zoom lens, and f1 is a focal length of the first lens unit.

13. An image pickup system comprising:

a zoom lens; and a controller configured to control the zoom lens during zooming, wherein the zoom lens includes, in order from an object side to an image side, a first lens unit having a negative refractive power and a second lens unit having a positive refractive power, a distance between the first lens unit and the second lens unit changing during zooming, and wherein the following conditional expressions are satisfied:

$$0.010 < fw/Lw < 0.050,$$

$$8.0 < m1/z < 40.0, \text{ and}$$

$$-3.5 < f1/fw < -0.8$$

where fw is a focal length of the zoom lens at a wide-angle end, Lw is an overall optical length at the wide-angle end, m1 is a moving amount of the first lens unit during zooming from the wide-angle end to a telephoto end, z is a magnification varying ratio of the zoom lens, and f1 is a focal length of the first lens unit.

14. The image pickup system according to claim 13, wherein the controller is configured separately from the zoom lens, and includes a transmitter configured to transmit a control signal for controlling the zoom lens.

15. The image pickup system according to claim 13, wherein the controller is configured separately from the zoom lens and has an operation unit for operating the zoom lens.

16. The image pickup system according to claim 13, further comprising a display unit configured to display information of a zoom of the zoom lens.

* * * * *